(12) United States Patent  
Schartner

(10) Patent No.: US 9,381,592 B2  
(45) Date of Patent: Jul. 5, 2016

(54) METHOD AND APPARATUS FOR PROVIDING WELDING TYPE POWER

(71) Applicant: Quinn W. Schartner, Kaukauna, WI (US)

(72) Inventor: Quinn W. Schartner, Kaukauna, WI (US)

(73) Assignee: Illinois Tool Works Inc., Glenview, IL (US)

(*) Notice: Subject to any disclaimer, the term of this patent is extended or adjusted under 35 U.S.C. 154(b) by 537 days.

(21) Appl. No.: 13/837,075

(22) Filed: Mar. 15, 2013

(65) Prior Publication Data

US 2014/0021179 A1  Jan. 23, 2014

Related U.S. Application Data

(60) Provisional application No. 61/674,722, filed on Jul. 23, 2012.

(51) Int. Cl.
*B23K 9/10* (2006.01)
*H02M 1/42* (2007.01)

(52) U.S. Cl.
CPC ............ *B23K 9/1006* (2013.01); *B23K 9/1075* (2013.01); *H02M 1/4216* (2013.01); *H02M 1/4225* (2013.01); *Y02P 70/181* (2015.11)

(58) Field of Classification Search
CPC .... B23K 9/1006; B23K 9/1075; F16C 29/06; F16C 29/0616; F16C 29/063; H02M 1/4216; H02M 1/4225

USPC ............... 219/130.1, 130.21, 130.31, 130.32, 219/130.33, 137 PS

See application file for complete search history.

(56) References Cited

U.S. PATENT DOCUMENTS

| 6,987,242 B2 | 1/2006 | Geissler |
| 7,049,546 B2 | 5/2006 | Thommes |
| 2009/0230941 A1 | 9/2009 | Vogel |
| 2011/0155703 A1* | 6/2011 | Winn ................... B23K 9/1075 219/121.54 |

FOREIGN PATENT DOCUMENTS

DE   19930678   * 3/2003

* cited by examiner

*Primary Examiner* — Dana Ross  
*Assistant Examiner* — Joseph Iskra  
(74) *Attorney, Agent, or Firm* — George R. Corrigan

(57) ABSTRACT

A method and apparatus for providing welding-type power includes receiving an input that may be either a single or a three phase input voltage. Three power modules, each having a single phase boost power circuit, and an output circuit process the input power. A weld output circuit receives and combines the outputs of the three power modules. An input power distribution module connects the three power modules such that each receives a unique single phase power signal. A controller controls the three power modules and the input power distribution module.

17 Claims, 17 Drawing Sheets

METHOD AND APPARATUS FOR PROVIDING WELDING TYPE POWER

FIELD OF THE INVENTION

The present disclosure relates to welding type power supplies that include a preregulator and an output circuit.

BACKGROUND OF THE INVENTION

There are many known types of welding-type power supplies. Welding-type power, as used herein, refers to power suitable for electric arc welding, plasma cutting or induction heating. Welding-type systems are often used in a variety of applications and moved from one location to another. Consequently, portability is desirable, and the ability to accept different input voltages and frequencies is desirable. Welding-type system, as used herein, is a system that can provide welding type power, and can include control and power circuitry, wire feeders, and ancillary equipment.

Providing welding-type power, and designing systems to provide welding type power, provides for some unique challenges. For example, power supplies for most fields are dedicated to a single input, or are rarely moved from one input to another. But, welding type systems will often be moved from one location to another, and be used with different inputs, such as single or three phase, or 115V, 230V, 460V, 575V, etc., or 50 hz or 60 hz signals. Power supplies that are designed for a single input cannot provide a consistent output across different input voltages, and components in these power supplies that operate safely at a particular input level can be damaged when operating at an alternative input level. Also, power supplies for most fields are designed for relatively steady loads. Welding, on the other hand, is a very dynamic process and numerous variables affect output current and load, such as arc length, electrode type, shield type, air currents, dirt on the work piece, puddle size, weld orientation, operator technique, and lastly the type of welding process determined to be most suitable for the application. These variables constantly change, and lead to a constantly changing and unpredictable output current and voltage. Finally, power supplies for many fields are designed for low-power outputs. Welding-type power supplies are high power and present many problems, such as switching losses, line losses, heat damage, inductive losses, and the creation of electromagnetic interference. Accordingly, welding-type power supply designers face many unique challenges.

One prior art welding power supply that is well suited for portability and for receiving different input voltages is a multi-stage system with a preregulator to condition the input power and provide a stable bus, and an output circuit that converts or transforms the stable bus to a welding-type output. Examples of such welding-type systems are described in U.S. Pat. No. 7,049,546 (Thommes) and U.S. Pat. No. 6,987,242 (Geissler), and US Patent Publication 20090230941 (Vogel), all three of which are owned by the owner of this invention, and hereby incorporate by reference. Miller® welders with the Autoline® feature include some of the features of this prior art.

FIG. 1 shows a prior art three-phase welding-type power supply consistent with U.S. Pat. Nos. 7,049,546 and 6,987,242 and US Patent Publication 20090230941, and receives the three phase input Va, Vb and Vc on an input rectifier consisting of diodes 101-106. The rectified input is provided to a boost circuit 110, which boosts the input to a desired voltage (800V, e.g.) on a boosted or intermediate bus. Boost circuit 110 can include power factor correction, if desired.

The boosted or intermediate bus is provided to a dc bus filter 112 (the bulk capacitance on the dc bus), and then to an isolated dc-dc converter 114. The dc-dc converter can include a converter (inverter, flyback, buck, etc), transformer and rectifier. The dc output is welding-type power. Such systems are significantly better than the prior art before them, and were the first welding-type systems to be "universal" in that they could accept nearly all available input power. They were also relatively portable and had improved power factors.

However, the three phase input rectifier commutates the line current between phases and forces discontinuous conduction. This occurs periodically—each time a line to line voltage exceeds the other two. As shown in FIGS. 2A-C, the current in each input line (Ia, Ib, & Ic) only conducts during two-thirds of the corresponding line cycle. The line current is zero for the remaining third, while the corresponding line voltage continues to follow the sinusoidal cycle above zero. As a result, the power factor, while better than other systems, is reduced because the line current no longer tracks the line voltage. FIGS. 2D-I show the current wave shape and conduction sequence of the three phase input rectifier diodes (101-106).

Operation of the three phase input rectifier may result in harmonic distortion of the line current. The harmonics distortion of the line current is driven by the abrupt non-sinusoidal step changes between zero and non-zero values as it commutates between phases.

Such prior art systems can also be designed for single or three phase operation, but are sometimes de-rated for single phase operation to achieve design goals for size, weight, and cost. The power circuit components must otherwise be designed for the additional current stresses required to meet rating during single phase operation. At the same power output, the line current required for single phase operation is increased by a $\sqrt{3}$ factor compared with the line current required for three phase operation.

The total power processed by such prior art systems is processed by a single power converter. Thus the power switch or input disconnecting device must be designed for the total power supply input current. Also parasitic inductances are increased by commonly used power semiconductor modules and by packaging constraints of physically larger components. These inductances are excited with higher switching currents, resulting in lower practical switching frequencies. Increased power dissipation is typically concentrated within larger individual components. This compromises the efficiency of the thermal design by localizing heat sources to relatively small spaces within the total volume of the power supply.

Accordingly, a welding-type system that maintains the advantages of prior art portable, universal input systems, but also avoids some of the deficiencies of the prior art is desired.

SUMMARY OF THE PRESENT INVENTION

According to a first aspect of the disclosure a welding-type system receives a three phase input. Three power modules, each including a single phase boost power circuit and an output circuit, receive the inputs. A weld output circuit combines the outputs of the three power modules. A controller controls the three power modules.

The three output circuits each include a dc bus filter and an isolated dc-dc converter, and a boosted or intermediate bus between the dc bus filter and the isolated dc-dc converter, in one embodiment.

According to a second aspect of the disclosure a welding-type system receives at least one three phase input voltage.

Three single phase boost power circuits each receive one of the three phases. An intermediate bus combines the outputs of the three boost circuits. An output circuit receives the intermediate bus and provides a welding type output. A controller controls the three single phase boost power circuits.

The welding-type system includes an input power distribution module that connects input connections of each power module to phases of the three phase input such that each module receives a unique single phase power signal in one embodiment.

The controller includes an input control module connected to control the input power distribution module in another embodiment.

According to a third aspect of the disclosure a welding-type system receives an input that may be either a single or a three phase input voltage, and includes three power modules, each having a single phase boost power circuit, and an output circuit. A weld output circuit receives and combines the outputs of the three power modules. An input power distribution module connects the three power modules such that each receives a unique single phase power signal. A controller controls the three power modules and the input power distribution module.

The three output circuits each include a dc bus filter and an isolated dc-dc converter, and a boosted or intermediate bus between the dc bus filter and the isolated dc-dc converter, in one embodiment.

According to a fourth aspect of the disclosure a welding-type system receives an input that may be either a single or a three phase input voltage includes three single phase boost power circuits, each of which provide a boosted signal across an intermediate bus. An output circuit receives the intermediate bus and provides a welding type output. An input power distribution module connects the three boost circuits to the input such that when the input is single phase each boost circuit receives the single phase input, and when the input is three phase each boost circuit receives a unique single phase power signal. A controller controls the three boost power circuits and controls the input power distribution module.

The outputs of each of the three modules are substantially equal in another embodiment.

The input power distribution module includes three power switches, each disposed to connect and disconnect one of the power modules from one of the inputs, and a pair of relays that selectively connect inputs to two of the power modules, and the controller includes an input control module connected to control the relays, in another embodiment.

The input power distribution module includes three power switches, each between an input and a power modules, and six relays that are connected to uniquely connect the power modules to two of the three inputs, and the controller controls the relays in a different embodiment. The relays may be before or after the power switches in various alternatives.

The welding-type system includes three precharge relays controlled by the controller, and each between a power module and one of the power inputs, in another embodiment.

The controller includes three boost control modules, each controlling one of the boost power circuits, and/or a welding system control module that receives a user input and provides a control signal, in various embodiments. The controller is in one location, or distributed such in the power modules in various alternatives.

A control power circuit receives power from each of the boosted busses in another embodiment.

The three single phase boost power circuits are power factor corrected boost circuits in another embodiment.

Other principal features and advantages of the disclosure will become apparent to those skilled in the art upon review of the following drawings, the detailed description and the appended claims.

Figure 1:
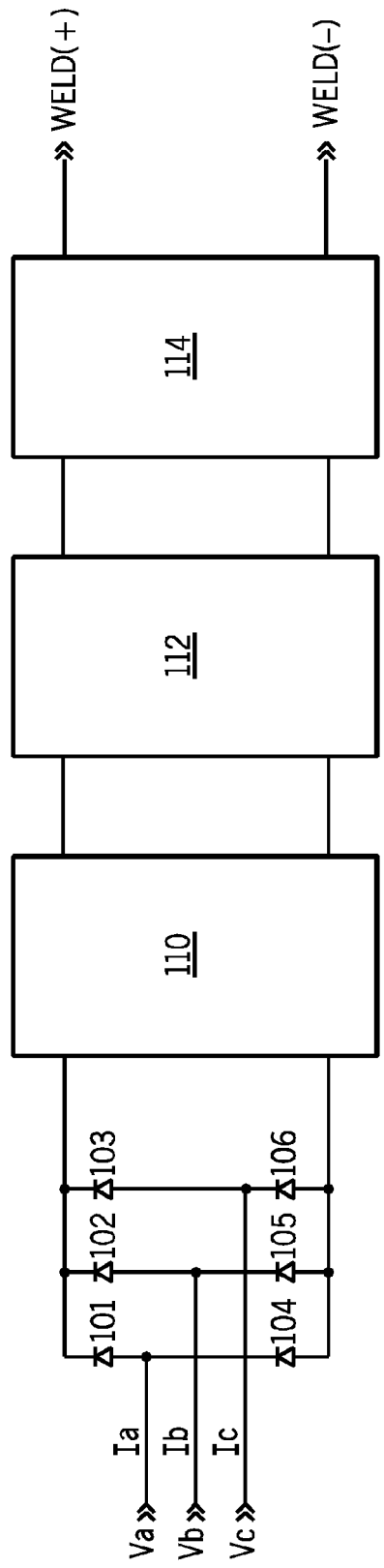
FIG. 1 is a diagram of a prior art welding-type system.
Figure 2A:
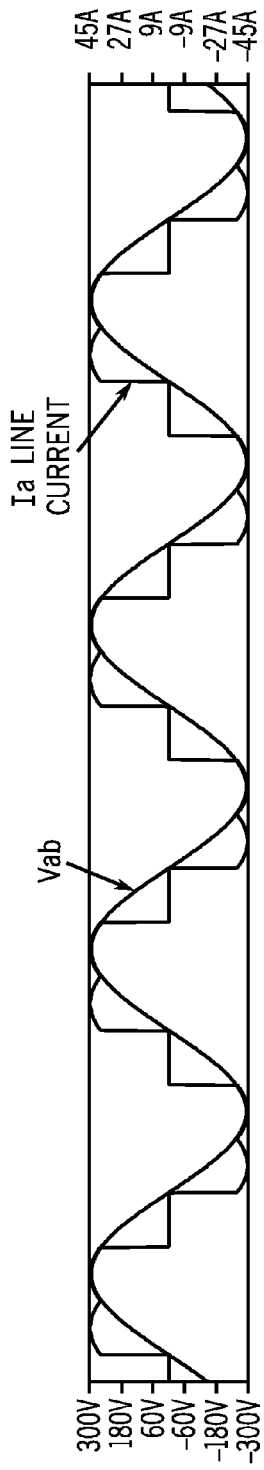
FIGS. 2A-I are waveforms of current and voltage from a welding-type system in accordance with the prior art of FIG. 1.
Figure 2B:
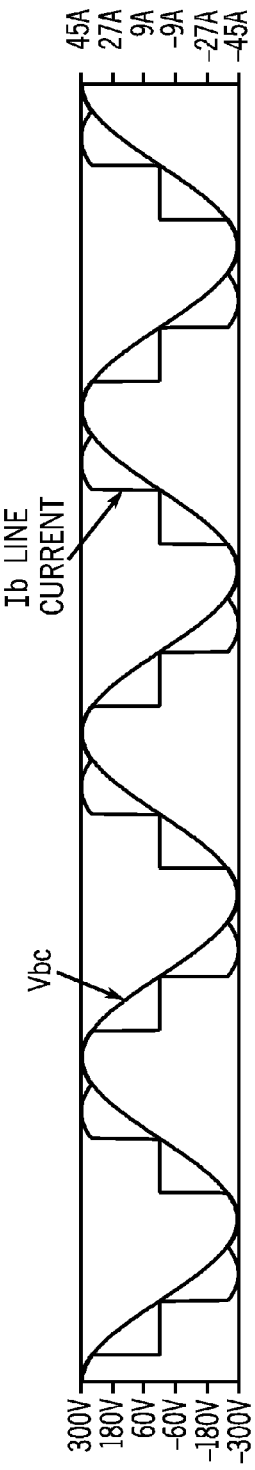
Figure 2C:
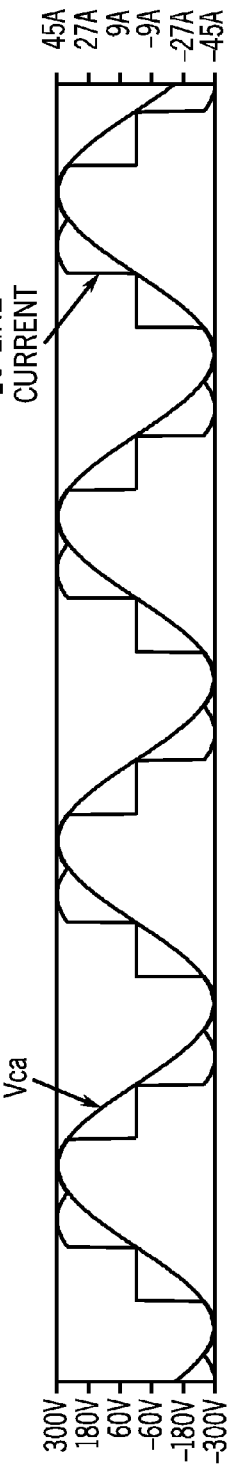
Figure 2D:
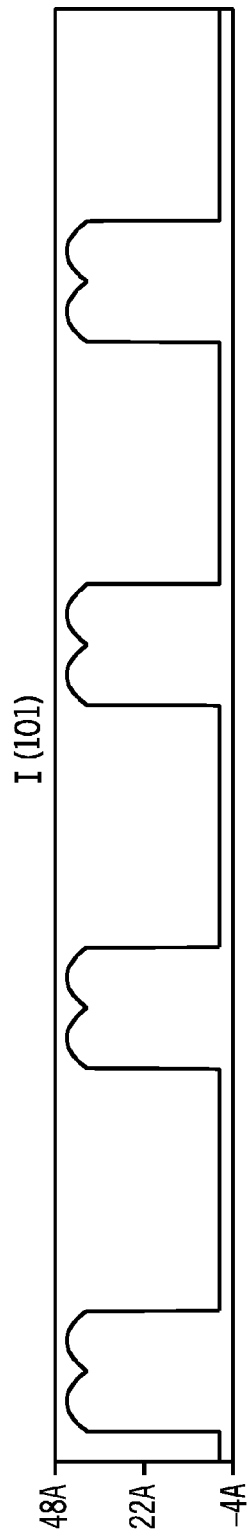
Figure 2E:
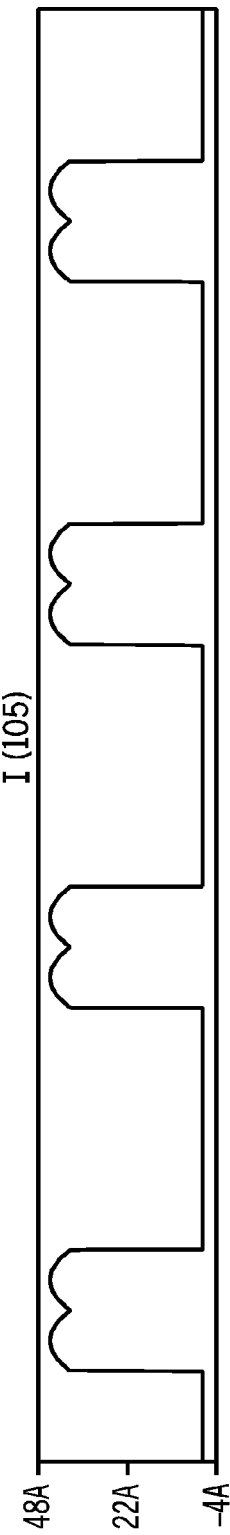
Figure 2F:
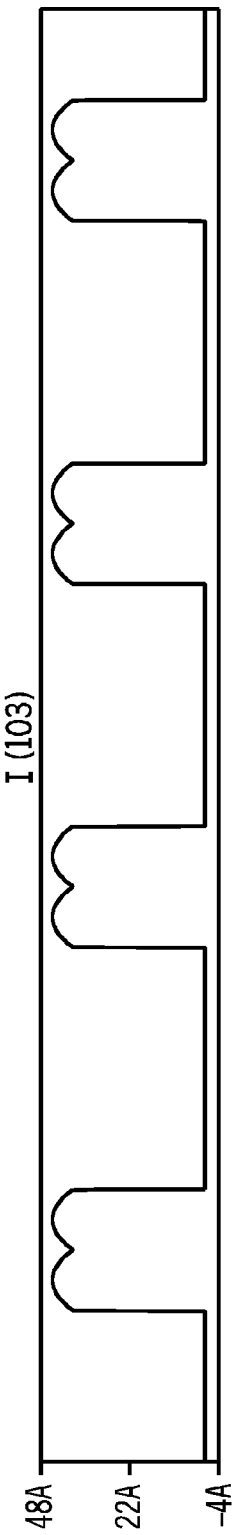
Figure 2H:
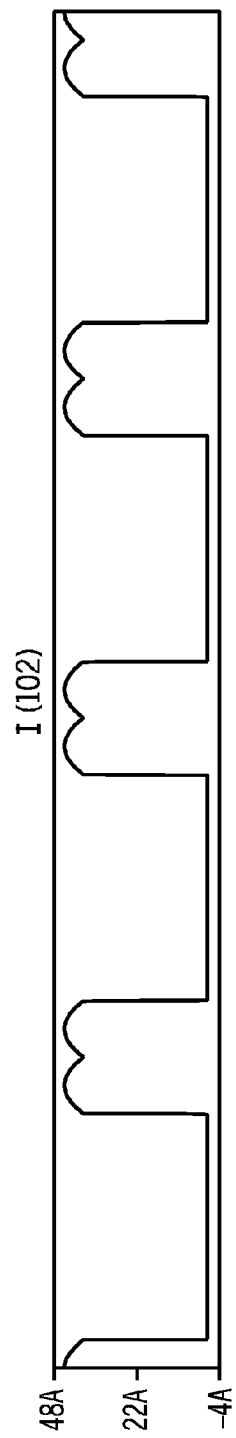
Figure 2G:
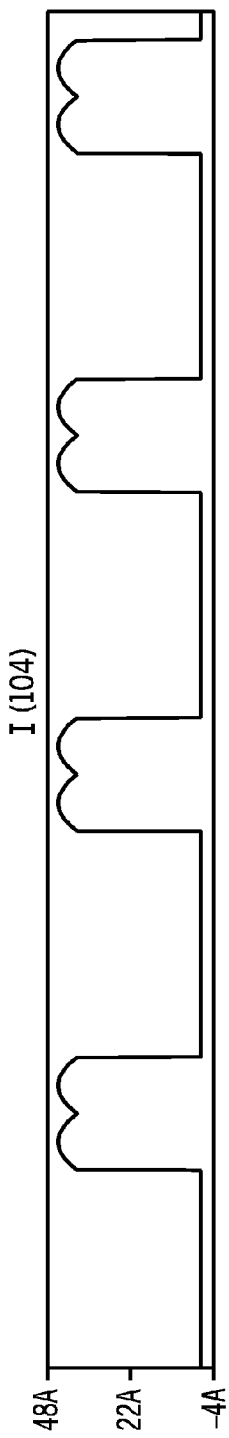
Figure 2I:
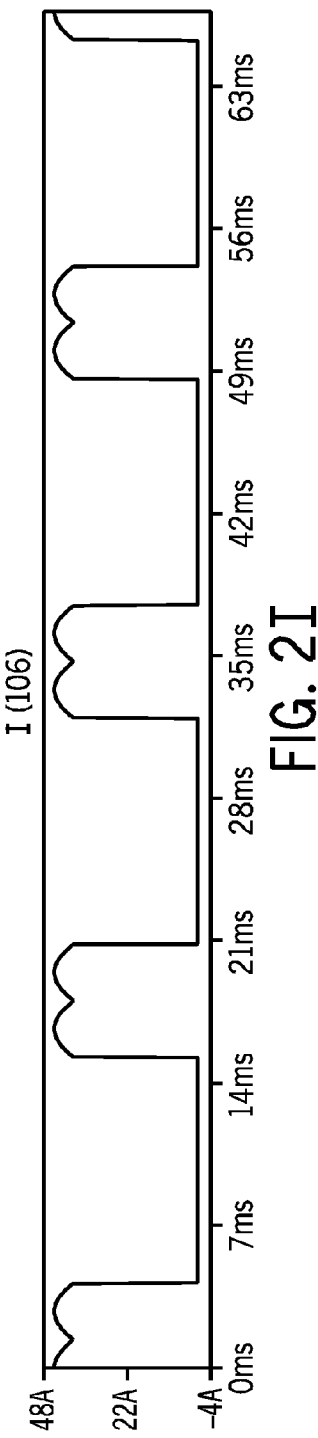

Before explaining at least one embodiment of the disclosure in detail it is to be understood that the disclosure is not limited in its application to the details of construction and the arrangement of the components set forth in the following description or illustrated in the drawings. The disclosure is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the system and method will be illustrated with reference to a particular configuration, it should be understood at the outset that they can also be implemented with other configurations.

The preferred embodiment of the disclosure is a welding-type system that is comprised of three power modules. Each power module includes a single phase boost circuit, preferably a power factor corrected boost power circuit and an output converter. An input power distribution module is provided between the input and the power modules, and automatically connects the modules to the input in a desired manner. Generally, when three phase power is applied the input power distribution module provides a unique phase to each power module. When a single phase input is applied, the input power distribution module applies the single phase to each module. A controller senses the type of input, and in response to the sensed input opens or closes relays to make the desired connections. Thus, the connection of the power modules optimizes the output for a given input.

Power module, as used herein, is a module that receives, processes, and provides power. Module, as used herein, is software and/or hardware that cooperates to perform one or more tasks, and can include digital commands, control circuitry, power circuitry, networking hardware, etc. A module can be located on a single board, or distributed across multiple locations. Power factor corrected, boost power circuit, as used herein, is a boost circuit with power factor correction provided by controlling the timing of the boost switch. Power distribution module, as used herein, is a module that receives input power, and selectively connects that input power to desired connections using controllable circuit elements such as switches, relays, transistors, etc. Controller, as used herein, is the digital and/or analog circuitry and/or logic/instructions that cooperate to provide control signals to one or more circuits. A controller can be located on a single board, or distributed across multiple locations.

Each power module preferably also includes an output circuit that is connected to the output of the boost circuit (an intermediate or boosted bus). The output circuits can be any known circuit, and are preferably dc-dc converters with isolation, such as a pwm inverter, followed by a transformer and a rectifier. Thus, each power module is similar to the power circuits of U.S. Pat. No. 6,987,242 or US Patent Publication 20090230941. Output circuit, as used herein, includes a direct connection from a power circuit to the output (such as to the weld studs), and includes an indirect connection through power processing circuitry such as filters, converters, transformers, rectifiers, etc.

A weld output circuit combines the outputs of the modules into a single welding output. Weld output circuit, as used herein, includes a direct connection from a power circuit to the output (such as to the weld studs), and includes an indirect connection through power processing circuitry such as filters, converters, transformers, rectifiers, etc. Combining outputs, as used herein, is adding the current from multiple power circuits to provide a single output.

One alternative embodiment provides that the power modules include the boost circuit, and feed a common boosted bus. A single output circuit is then provided, and it provides the welding output. The single output circuit may be any known circuit, and is preferably a dc-dc converter with isolation, The preferred embodiment provides that the power modules are identical (or very similar) for ease of manufacturing and ease of load sharing. The modules are preferably scalable to the required input voltage ranges and output ratings. Multiple modules can be connected together to increase the total power supply output rating. Each power module is preferably designed to operate on single phase power, but the power distribution module connects them in such a way as to allow both single and three phase operation. Balanced three phase operation requires that the power modules be connected together in multiples of three. For greater power ratings, six modules can be used, where each modules as described above is replaced by two modules. This effectively doubles the output capacity of the welding-type system.

For example, a power module may be designed for 75 amps output with a rated single phase input voltage range of 115-230 VAC. Two of these modules could be connected together within a power supply to produce a total output rating of 150 amps, with a rated single phase input voltage range of 115-230 VAC. Three could be connected for 225 amps, etc. Another power module may be designed for 100 amps output with a rated single phase input voltage range of 208-575 VAC. Three of these modules could be connected together within a power supply to produce a 300 amp output rating, with a rated single or three phase input voltage range of 208-575 VAC. Other modules can be designed for 115V-575V, or for smaller ranges.

Figure 3A:
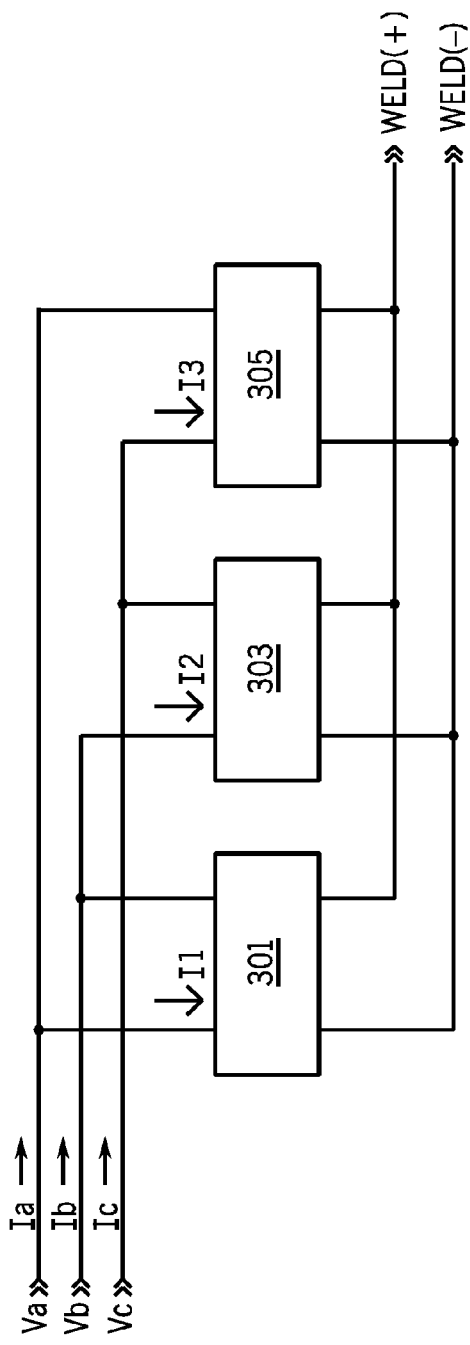
FIG. 3A is a diagram of a welding-type system in accordance with the preferred embodiment with a three phase input.
Figure 3B:
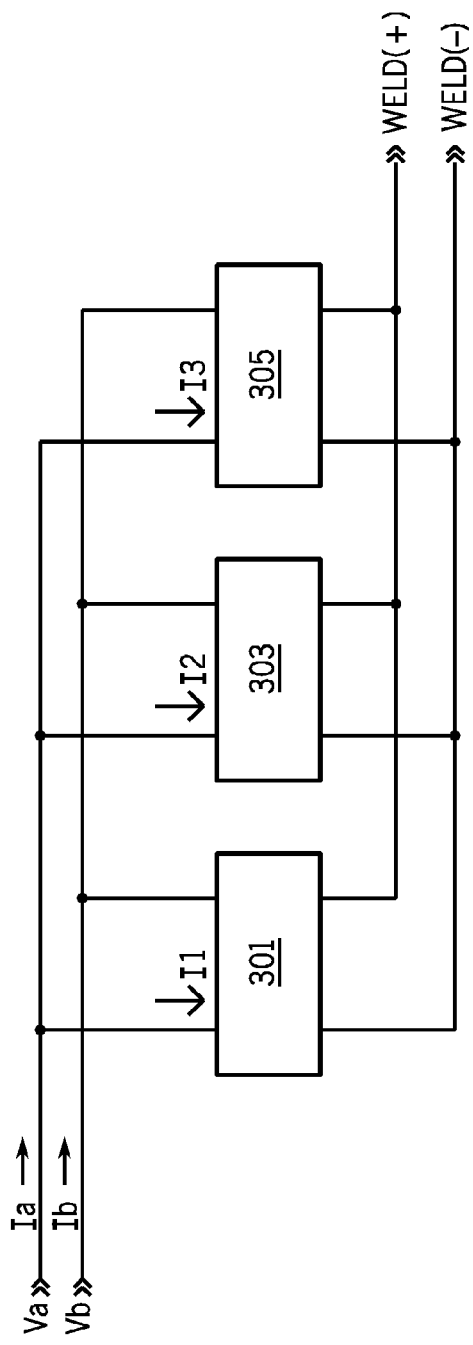
FIG. 3B is a diagram of a welding-type system in accordance with the preferred embodiment with a single phase input.

FIGS. 3A and 3B show a modular welding-type system connected in a three phase and a single phase arrangement. For ease of understanding, the connections shown are hard wired, and the input power distribution module is not shown (but will be discussed below). The connections shown are what effectively result when the input power distribution module is used.

A welding-type system in accordance with the preferred embodiment includes power modules 301, 303 and 305. Each module preferably includes a pair of input connections, a power factor corrected boost power circuit that receives the input, and a dc-dc isolated output converter—i.e., an AC to DC power factor correction module connected to the utility mains, a primary side DC to AC inverter, a high frequency isolation transformer, and an output section to convert the transformer output to an output suitable for welding, cutting or induction heating (weld+ and weld−). Each single phase power module has a 100% output rating and is capable of receiving a range of single phase input voltages and frequencies.

FIG. 3A shows the connections for three phase input, where each module receives a unique single phase power signal. Module 301 receives power inputs Va-Vb, module 303 receives power inputs Vb-Vc, and module 305 receives power inputs Vc-Va. Each module may be designed to optimally receive a single phase input, and each provides a better power factor than a single three phase boost circuit can provide. If modules 301-305 are identical modules, then the total output of the welding-type system can easily be divided among modules 301-305 such that they have substantially equal outputs (i.e, there may be transient variations, but over the long term there is very little difference between the total power processed by each module). Current flow is shown by Ia, Ib and Ic.

FIG. 3B shows the connections for a single phase input, where each module receives the same single phase input. In both arrangements the outputs are combined to provide a single welding output (weld+ and weld−). Power input, as used herein, includes a single input power conductor (including multi stranded conductors). Given the arrangement, the output rating is the same for both single (FIG. 3B) and three phase (FIG. 3A) operation. Current flow is shown by Ia and Ib.

Figure 4A:
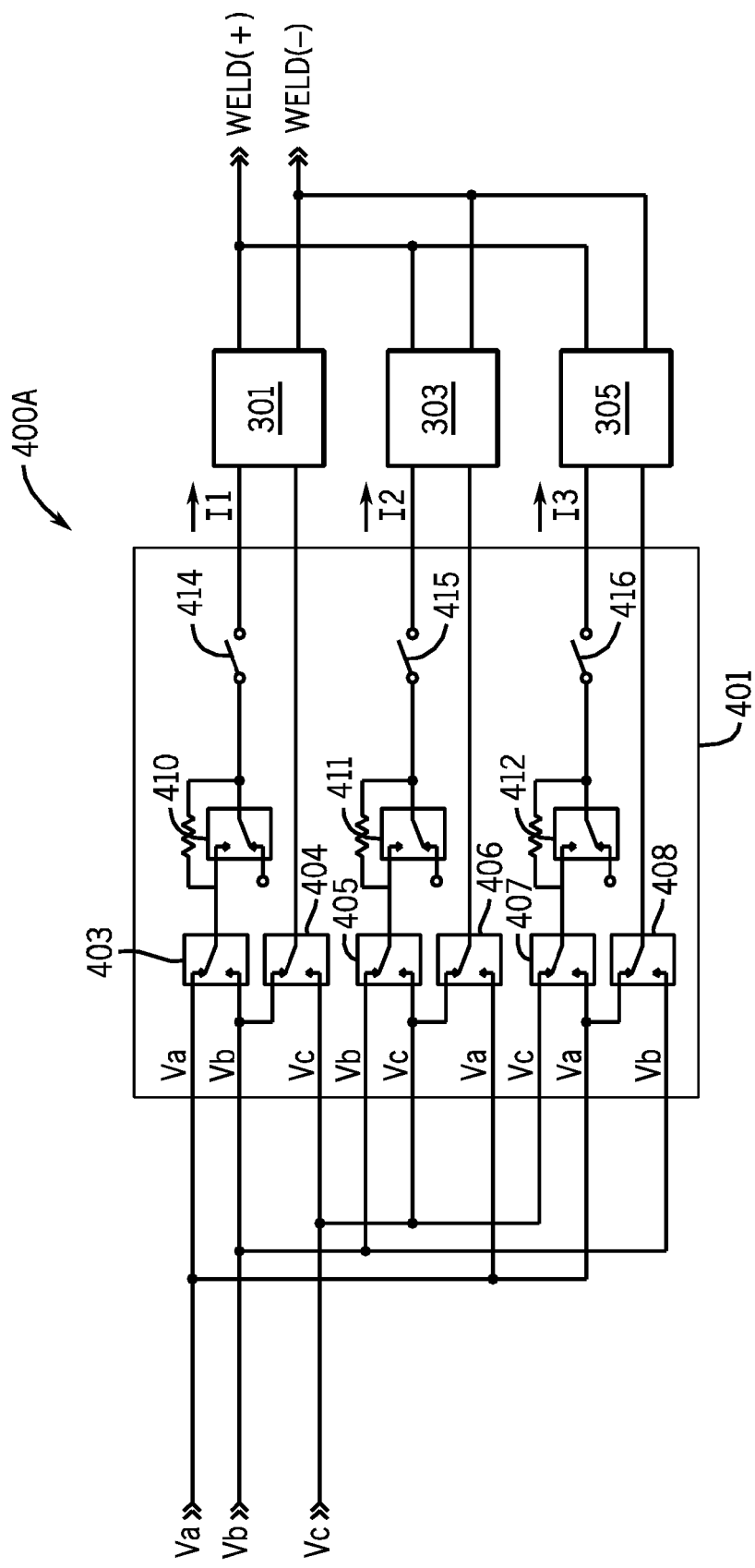
FIGS. 4A-4C show welding-type systems in accordance with the preferred embodiment with the input power distribution modules shown in more detail.
Figure 4B:
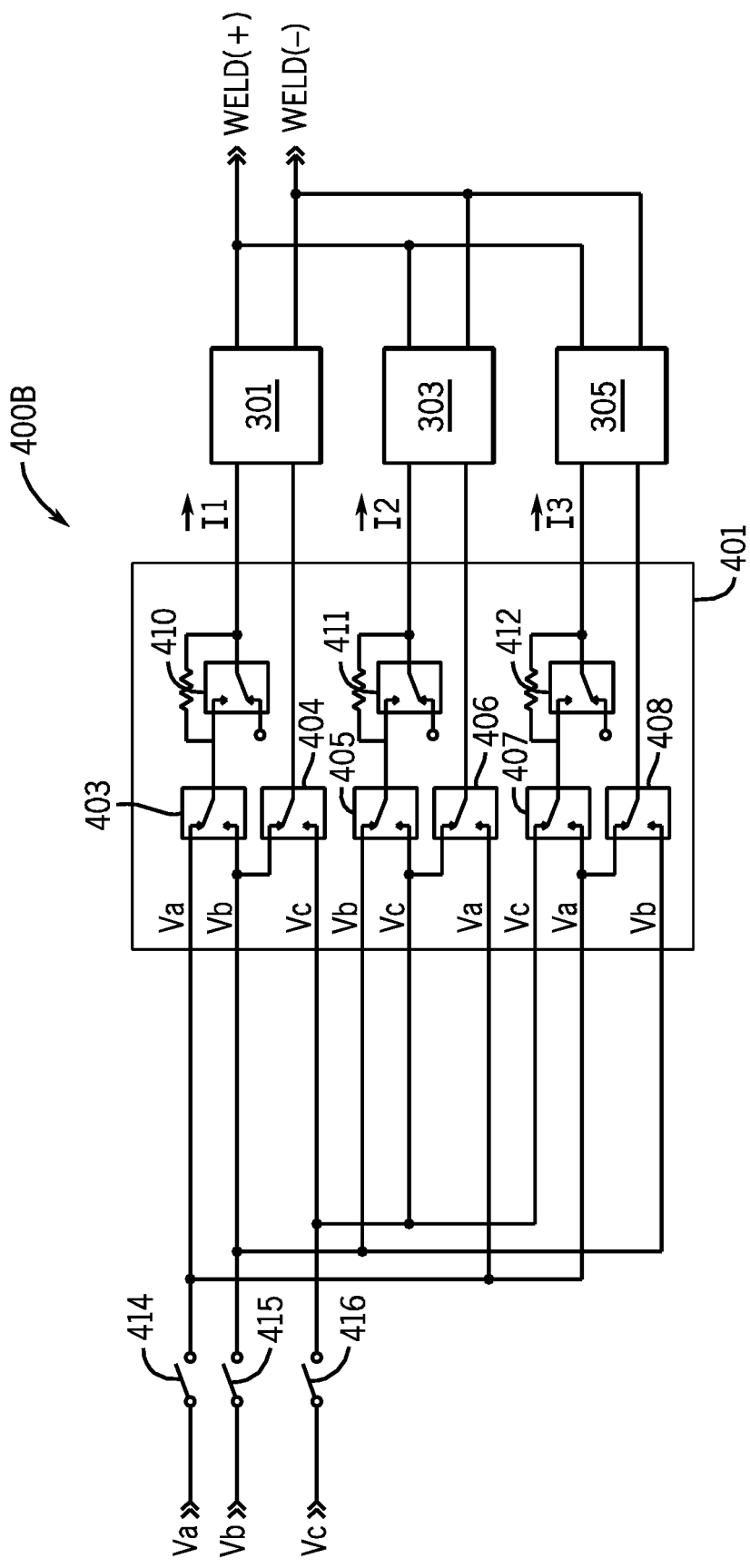
Figure 4C:
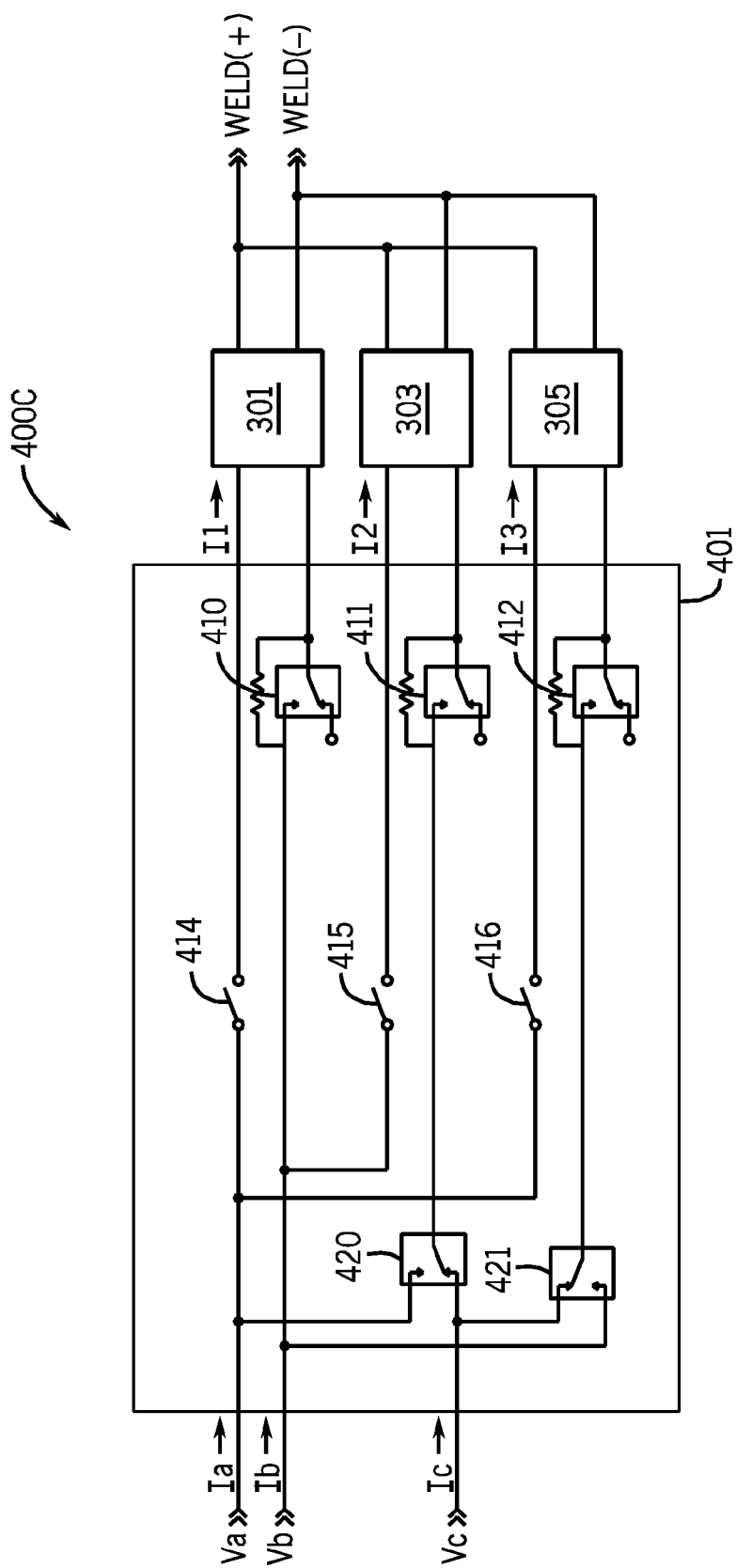

FIGS. 4A-4C show details of various embodiments of a power distribution module, along with power modules 301-305. FIG. 4A shows a welding-type system with an input power distribution module 401 that includes relays 403-408, precharge relays 410-412, and power switches 414-416, along with power modules 301-305. Compared to the total power supply line current, the line current supplying each of power modules 301-305 is reduced by a factor of three for single phase operation and by a factor of $\sqrt{3}$ for three phase operation. Precharge relay, as used herein, is a relay used to control precharging a welding-type system. Power switch, as used herein, is a switch used to turn the power to a welding-type system on and off, and includes single or multi-pole switches, and a single pole of a multi-pole switch.

Power switches 414-416 may be three single pole switches, or three poles of a multi-pole switch. Each switch 414-416 carries one phase of input current in the arrangement. Power switches 414-416 are the main on-off switches for the welding-type system. Input power switches 414-416 are not required to carry the total power supply line current, they carry the module current, which is less by a factor of three for single phase operation and by a factor of √3 for three phase operation (than if they carried the total input current).

Precharge relays 410-412 each have a resistor associated therewith, and operate in a manner consistent with the prior art. When the system is powered up, the resistors limit the inrush current. When the system is precharged, precharge relays 410-412 are closed to bypass the resistors.

Input distribution module 401 in general, and relays 403-408 in particular, are configurable to connect the input to power modules 301-305 for either single or three phase power. Relays 403-408 selectively connect one of the power inputs (Va, Vb and Vc) to input connections of power modules 301-305. Selectively connecting one of two power inputs to an of input connection, as used herein, is to connect a desired one of the two using a controllable circuit elements such as switches, relays, transistors, etc. Given the arrangement shown, at least one power module will receive power no matter how the input is connected. This allows that particular power module to provide an intermediate bus, which in turn can be used to provide control power (similar to the manner taught in U.S. Pat. No. 6,987,242 or US Patent Publication 20090230941). Once control power is established the relays can be opened or closed to connect all power modules. If three phase power is applied, each power module 301-305 will receive single phase power with the relays in their normally closed positions (as shown).

However, if single phase power is applied, all of power modules 301-305 will receive power by proper control of relays 403-408. Initially, at least one power module receives power. If single phase power is applied across Va-Vb, then power module 301 receives power. If single phase power is applied across Vb-Vc, then power module 303 receives power. If single phase power is applied across Vc-Va, then power module 305 receives power. Control power is derived from all three intermediate busses (or a single combined intermediate bus in alternative arrangements).

The control power is used to power logic that determines which two of power connections Va, Vb and Vc are receiving the single phase power. Relays 403-408 are controlled in response to the logical determination of where the input power is applied. If the input power is sensed to be single phase Va-Vb (for example using sensors on the inputs, on the input rectifiers or in the boost circuit), then the normally open contact of relay 406 is closed to connect Va to one of the pair of input connections of power module 303, and the normally open contact of relay 408 is closed to connect Vb to one of the pair of input connections of power module 305. Thus, each power module receives the single phase input. Any input can be accommodated by appropriate control of relays 403-408. This arrangement is auto-phase detect since power on any input is detected and can be accommodated.

FIG. 4B shows an arrangement similar to that of FIG. 4A, but power switches 414-416 are placed in the input lines prior to relays 403-408. Power switches 414-416 each carry a three phase load in the arrangement of FIG. 4B. Thus, greater current passes through power switches 414-416 (about 1.7 times) in the arrangement of FIG. 4B than in the arrangement of FIG. 4A. Current flow is shown by I1, I2 and I3.

FIG. 4C shows input power distribution 401 having a pair of relays 420 and 421 instead of relays 403-408. This arrangement requires that a single phase input be Va-Vb, so that single phase power can be applied to each of power modules 301-305. The control of input distribution module 401 is similar to the control described above (but the relay positions are adapted for the relays shown in FIG. 4C). The normally closed contacts of relays 420-421 default for utility mains connection with three phase operation. When the power switch is closed, the power supply control circuitry senses whether the utility mains connection is single or three phase. If a single phase utility mains connection is sensed, the normally closed contacts of relays 420-421 are opened and the normally open contacts are closed. The power supply is then connected for single phase operation, with all three single phase power modules connected in parallel across the single phase utility mains Va-Vb. Input current flow is shown by Ia, Ib and Ic. Output current flow is shown by I1, I2 and I3.

One feature of the preferred embodiment is that if the utility mains connection is incorrectly sensed, no damage occurs to the welding power supply. If the sensing circuitry incorrectly connects the power supply for single phase operation when the input is actually three phase, the power supply can deliver the rated output. If the sensing circuitry incorrectly connects the power supply for three phase operation when the input is actually single phase, the power supply can deliver one-third the rated output. One alternative embodiment provides for manually linking the inputs, instead of using input power distribution module 401.

Figure 5:
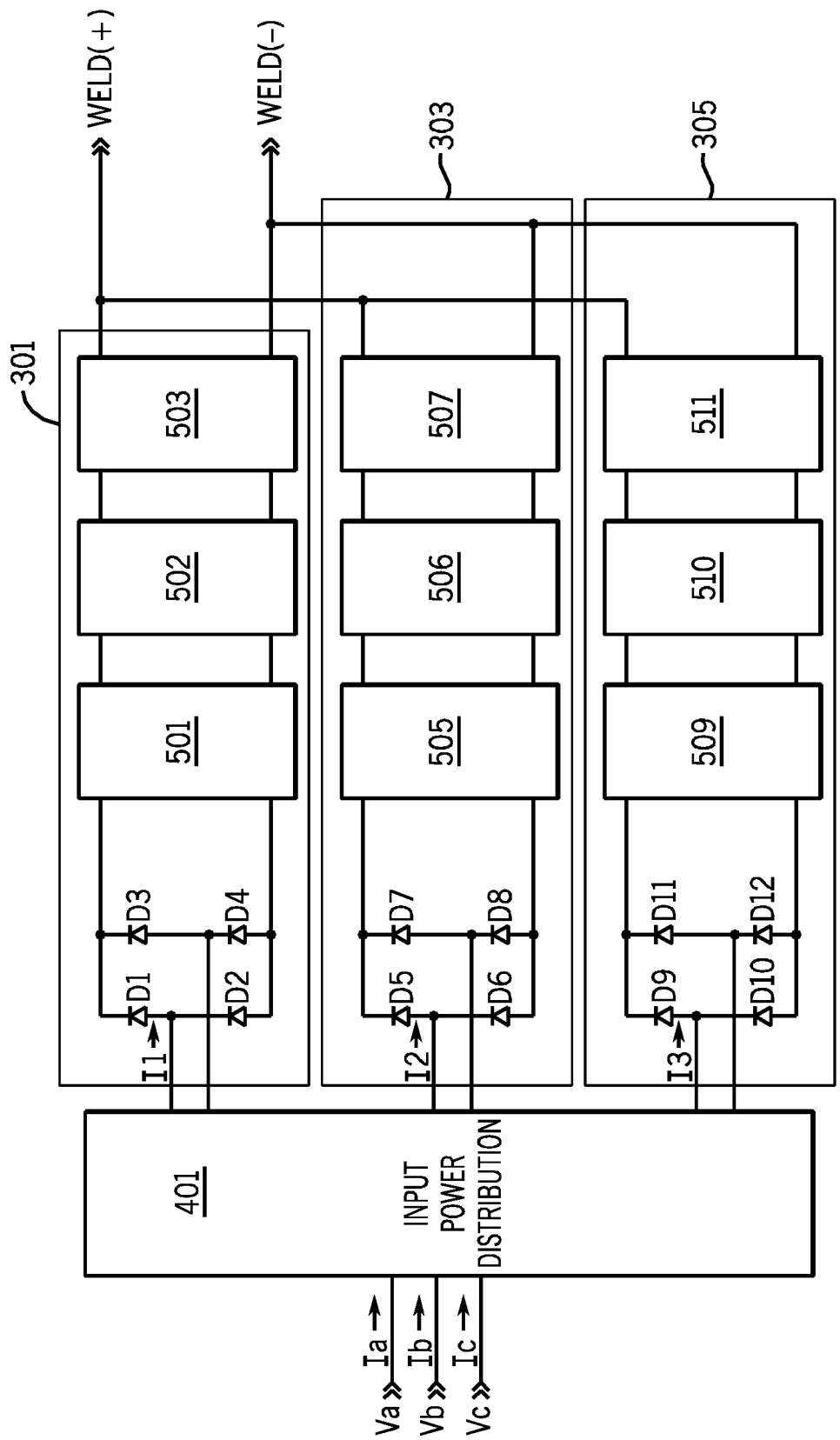
FIG. 5 is a diagram of welding-type system showing modules 301-305 in more detail.
Figure 6A:
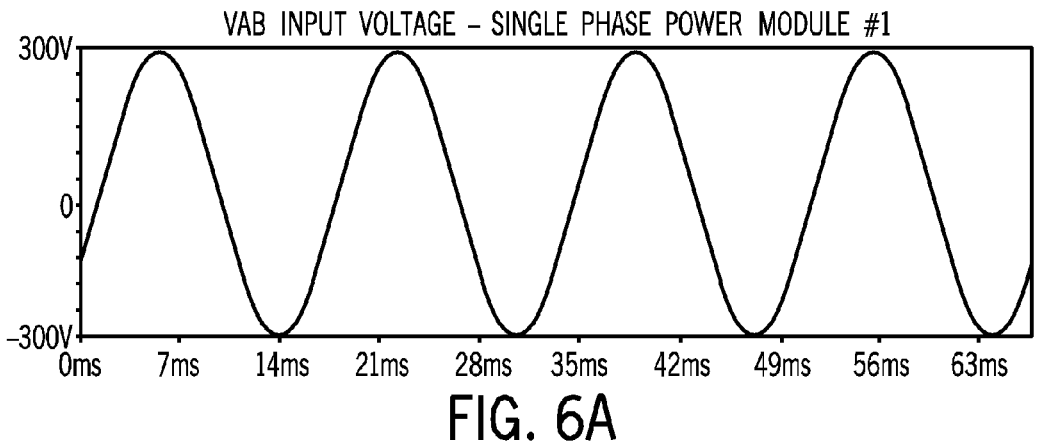
FIGS. 6A-D are graphs of input voltage, input current, and rectifier current for module 301.
Figure 6B:
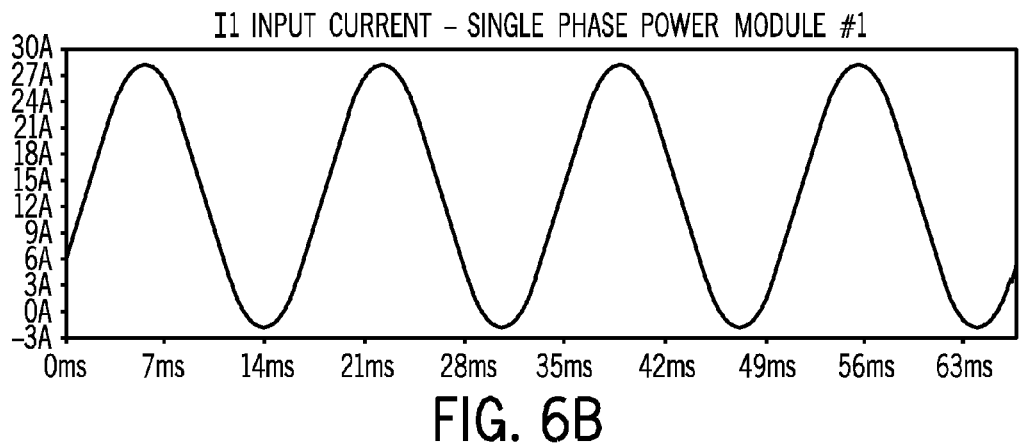
Figure 6C:
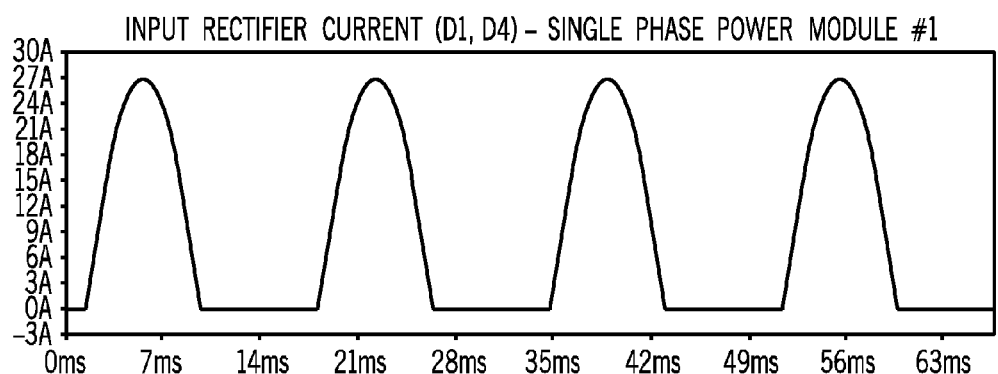
Figure 6D:
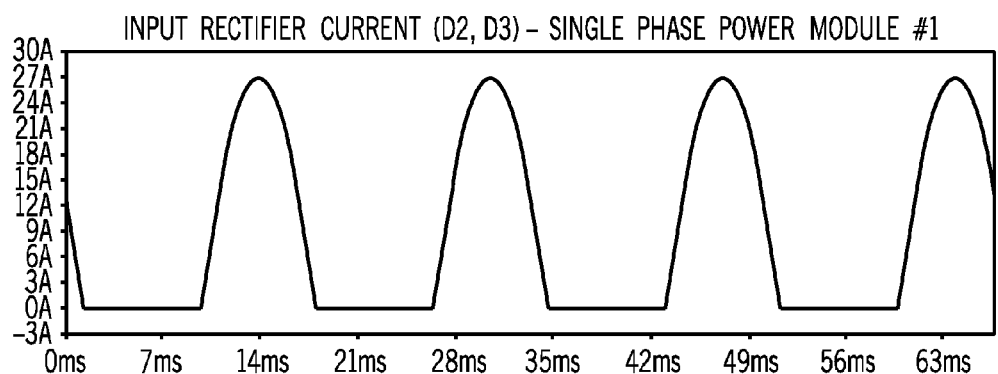
Figure 7A:
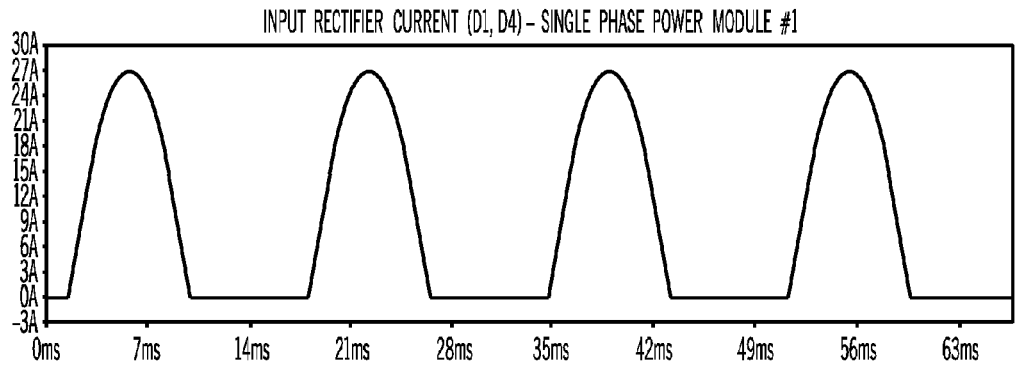
FIGS. 7A-F are graphs of rectifier current for modules 301-305.
Figure 7B:
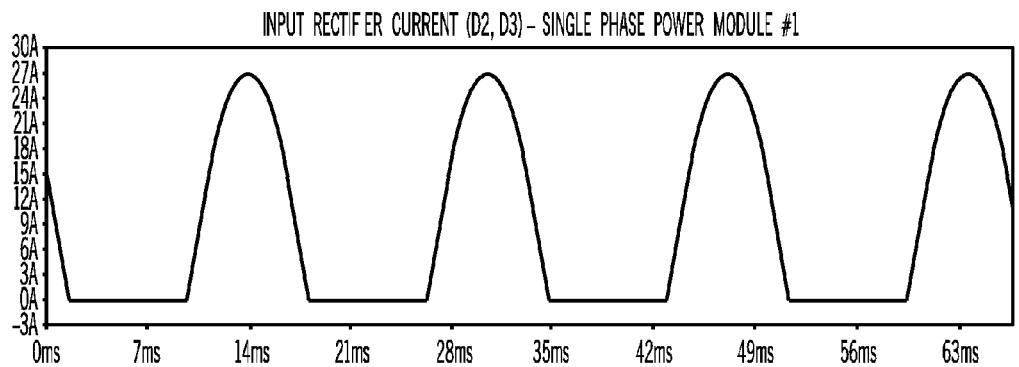
Figure 7C:
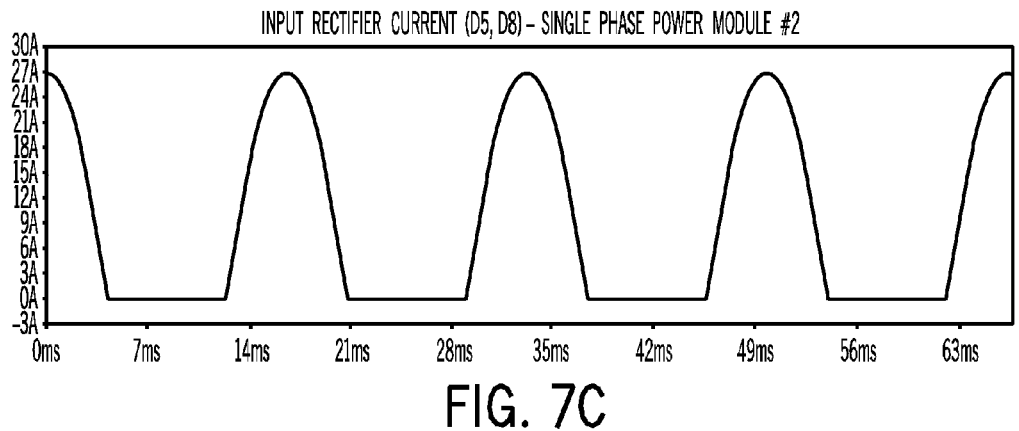
Figure 7D:
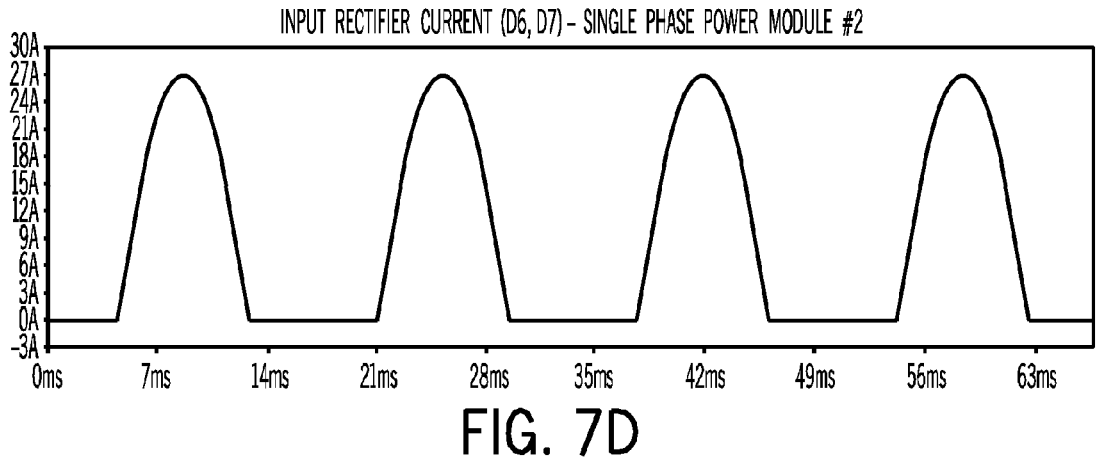
Figure 7E:
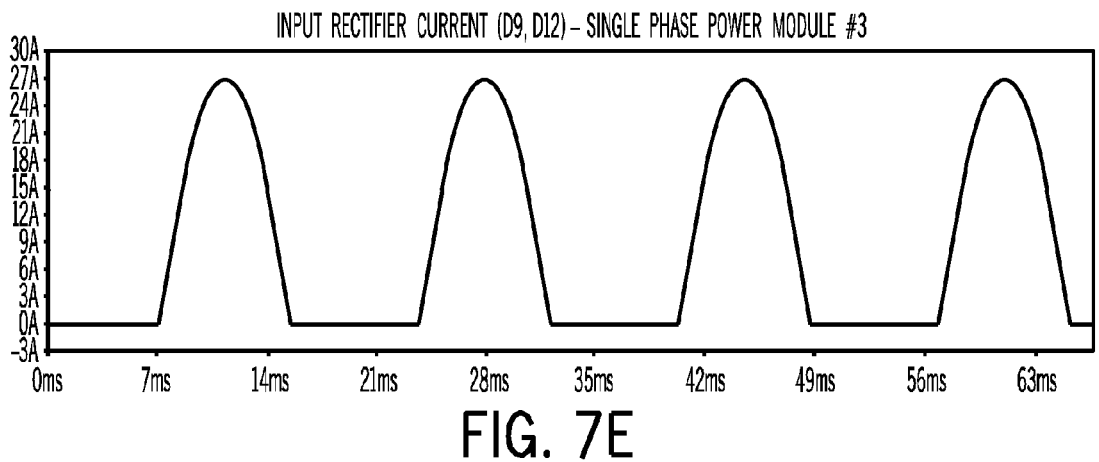
Figure 7F:
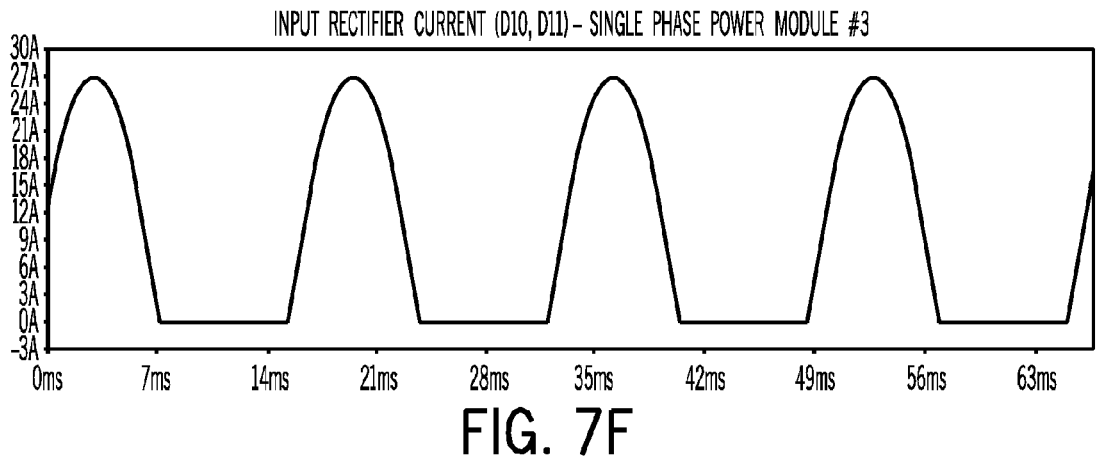

FIG. 5 shows greater detail for power modules 301-305. Each of power modules 301-305 receives a rectified input from an input rectifier (D1-D4, D5-D8 and D9-D12), and includes a boost pfc circuit or module (501, 505, 509), a dc bus filter (502, 506, 510) and an isolated converter (503, 507, 511). In some embodiments the rectifiers are part of modules 501, 505 and 509. The single phase input rectifiers and boost pfc converters eliminate the input line current commutation problem described above for three phase operation in prior art. The single phase input stages allow the line current to track the sinusoidal input voltages and provide unity power factor correction on each of the three input lines.

FIGS. 6A-D show a sinusoidal input line current (11) in phase with the sinusoidal input voltage (Vab) supplying power module 301 and the current wave shape and conduction sequence of the single phase input rectifier diodes D1-D4. Waveforms for modules 303 and 305 are identical, but shifted by 120 and 240 degrees, respectively. FIGS. 7A-F show the currents in each of the input diodes, for all three power modules.

Figure 8:
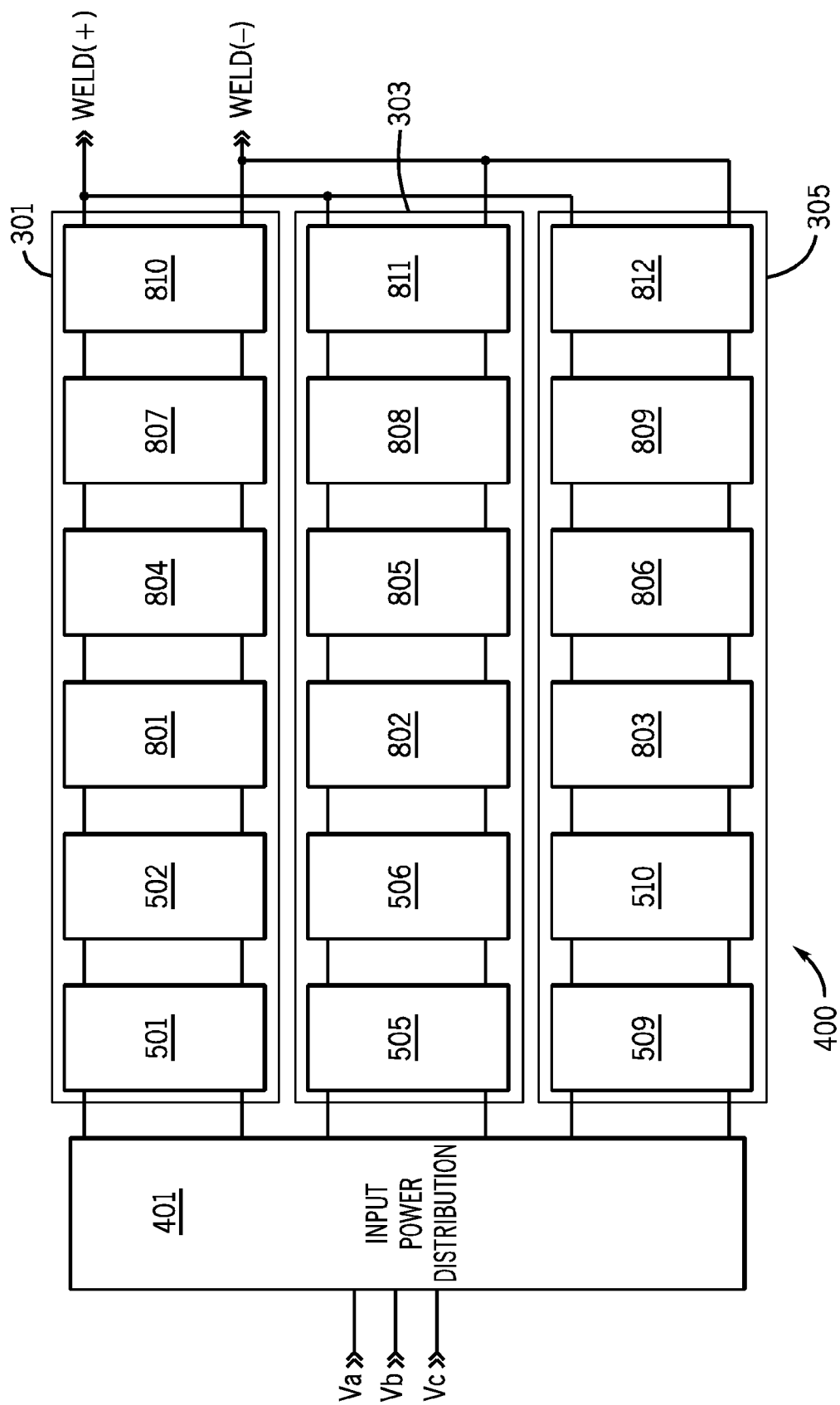
FIG. 8 is a diagram of welding-type system of FIG. 4 showing converters 301, 303 and 305 in more detail.

FIG. 8 is a diagram of the welding-type system of FIG. 4, showing more detail for isolated dc-dc converters 503, 507 and 511. In this embodiment the rectifiers are part of boost converters 501, 505 and 509. Each of output circuits 503, 507 and 511 includes an inverter (801-803), a high frequency transformer (804-806), a weld output rectifier (807-809) and a weld output filter (810-812). Each of these circuits may be consistent with the prior art.

Figure 9:
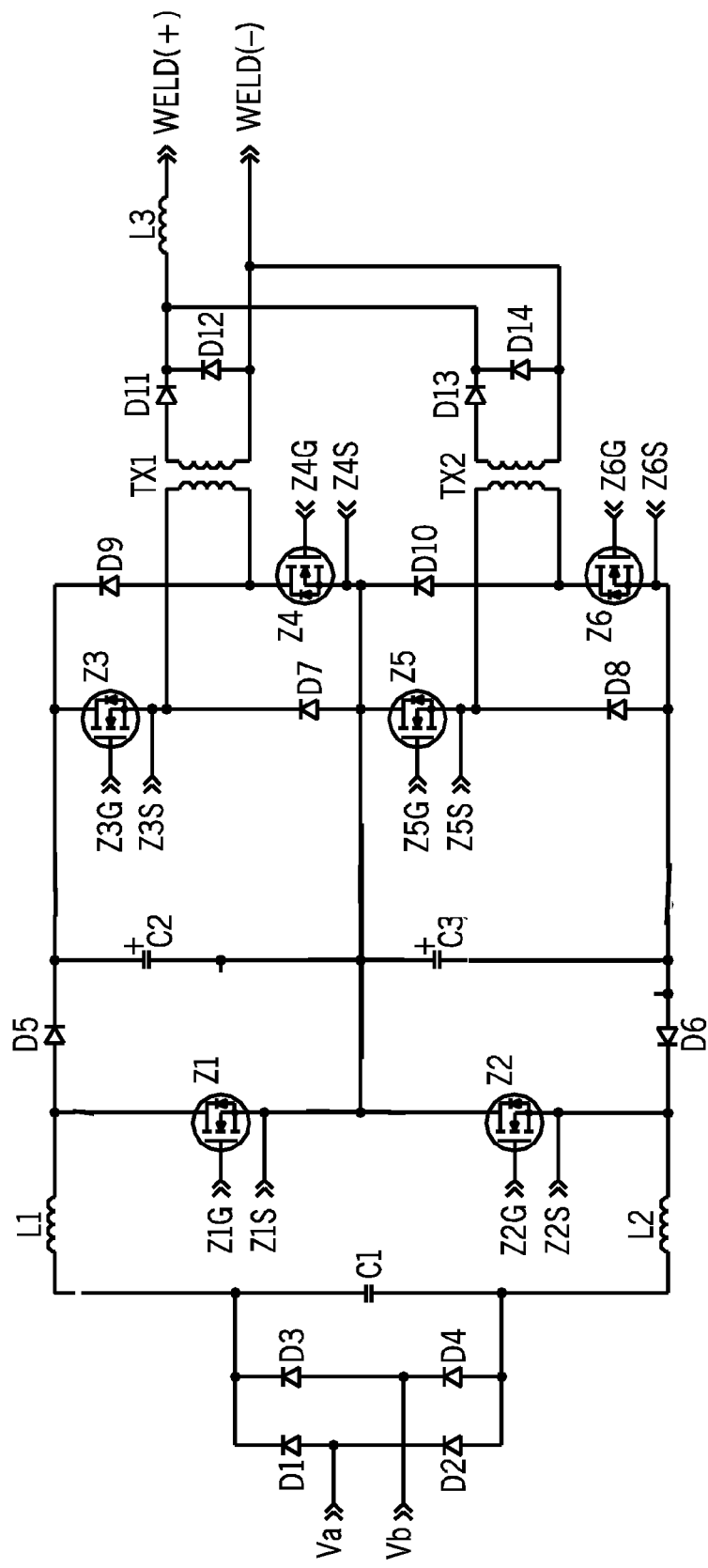
FIG. 9 is a circuit diagram of a power module in accordance with the preferred embodiment.

FIG. 9 is a diagram implementing power modules 301-305. It is a stacked boost design, and includes rectifier diodes D1-D4, a pair of boost inductors L1 and L2, boost switches Z1 and Z2, and diodes D5 and D6, that feed a split bus across capacitors C2-C3. A pwm forward converter circuit includes switches Z3-Z6 and diodes D7-D10. The inverter output is provided to primary windings on transformers T1 and T2. The secondary windings of T1 and T2 feed rectifiers D11-D14, and the output is provided through inductor L3.

Figure 10:
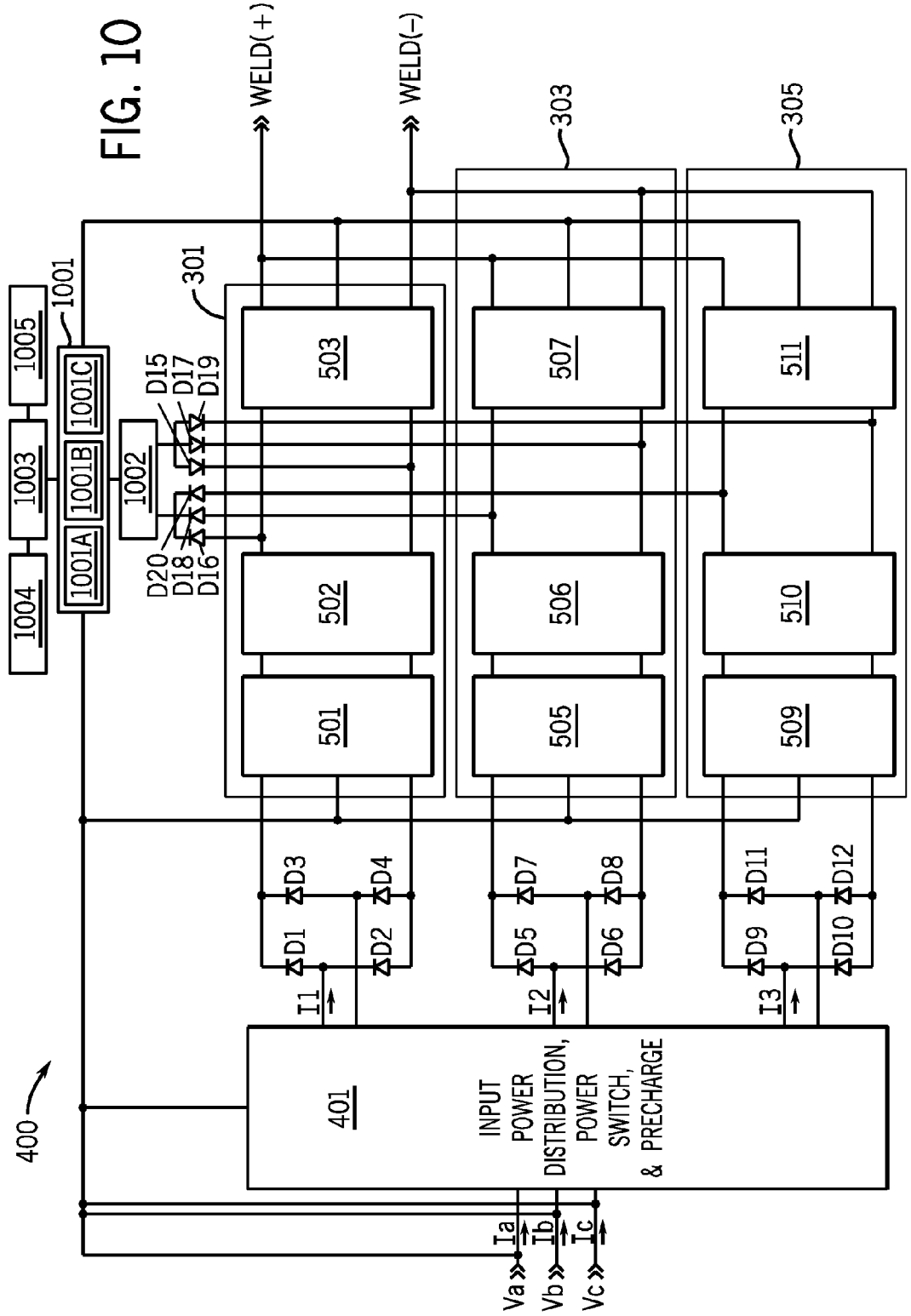
FIG. 10 shows a controller of a welding-type system in accordance with the disclosure.

FIG. 10 shows a controller 1001 that includes pfc boost control modules 1001A, 1001B and 1001C. Controller 1001 provides control signals to the switches in power modules 501, 503 and 505, and receives feedback from them or the intermediate bus (in 502, 506, 510). Each pfc boost control module 1001A-C receives feedback from and controls a power module. Pfc boost control module, as used herein, is a control module that controls a boost, power factor corrected, power circuit. Each pfc boost control module 1001A-C may be consistent with the prior art such as that described in U.S.

Pat. No. 6,987,242 or US Patent Publication 20090230941. However, the preferred embodiment provides for some differences with the prior art, as discussed below.

Controller 1001 also receives current feedback from the input connections, to determine if the power is single or three phase, and if single phase on which inputs. In response to that determination, controller 1001 provides control signals to input power distribution module 401. A welding system control module 1003 receives a user input via a user interface 1004. Welding system control module, as used herein, is a control module that controls a welding-type system to provide a desired welding output in response to a user input such as amperage, WFS, wave shape, etc. Welding system control module 1003 provides setpoints etc to each of pfc boost control modules 1001A-C. Controller 1001 can also receive feedback indicative of the combined welding output. A welding system accessory interface 1005 is also provided. User interface 1004, welding system control 1003 and accessory interface 1005 may be similar to those in existing power supplies and recognized by those skilled in the art.

A control/aux power circuit 1002 provides power to controller 1001. Control aux/power circuit 1001 preferably derives power from the intermediate busses. When the power switch is turned ON, the power supply input mains connection is defaulted to three phase operation, as discussed as shown in FIGS. 4A-4C. If the power supply is connected to a single phase input mains connection, only one of power modules 301-305 will initially receive power. Additionally, any of the three modules could receive power, depending on how the power cord is physically terminated to the input mains. The connection scheme shown in FIGS. 4A-B addresses this problem. Moreover, control/auxiliary power circuit 1002 is connected to the DC bus of each of power modules 301-305 through diodes D15-D20. The common cathode connection of D16, D18, and D20 provide positive input voltage to the Control/Auxiliary Power Supply, while the common anode connection of D15, D17 and D19 provide the input common return path. This connection assures control/auxiliary power circuit 1002 can receive power from any one of power modules 301-305. Control/auxiliary power circuit 1002 can then provide control power to the input sensing circuitry and configure the relays for operation. Control/auxiliary power supply 1002 also provides a DC bus discharge path for each of the power modules 301-305. This allows each of the busses to be actively discharged when the power is turned off.

Controller 1001 includes separate closed loop control of the DC bus voltage regulation and output current regulation for each of power modules 301-305. The input phase current and DC bus voltage regulation are integral to the boost pfc control, while the output current regulation is integral to the DC-DC converter control. Each control loop includes one of modules 1001A-C and each receives independent voltage or current feedback from the corresponding module. The independent feedback signals are compared with a reference or command value, and a corresponding error signal is produced. The error signals are pulse width modulated, creating a duty cycle proportional to the analog signal value. The three independent PWM signals are distributed from the controller to their corresponding power semiconductor gate circuitry within each power module. The independent closed loop control of the output current provides equal current sharing between modules, and addresses timing and component tolerance issues. In the preferred embodiment, the PWM signals are constructed from a synchronous clock source and can be phase shifted with respect to each other. The output current ripple can be reduced or minimized by introducing a 120 degree phase shift between each of the dc-dc converter PWM's. The preferred phase shift depends on the number of modules, and in the preferred embodiment a phase shift of 360/n, for n modules, is used. The fixed phase shift also eliminates or reduces asynchronous ripples current between modules. The Boost pfc converter PWM's can also be phase shifted with respect to each other and/or the dc-dc converters. This may provide additional advantages in reducing input mains distortion. Alternatives provide for a single controller module for all three power modules. The boost control scheme can help reduce line current harmonics, lower EMI, lower switch losses.

Figure 11:
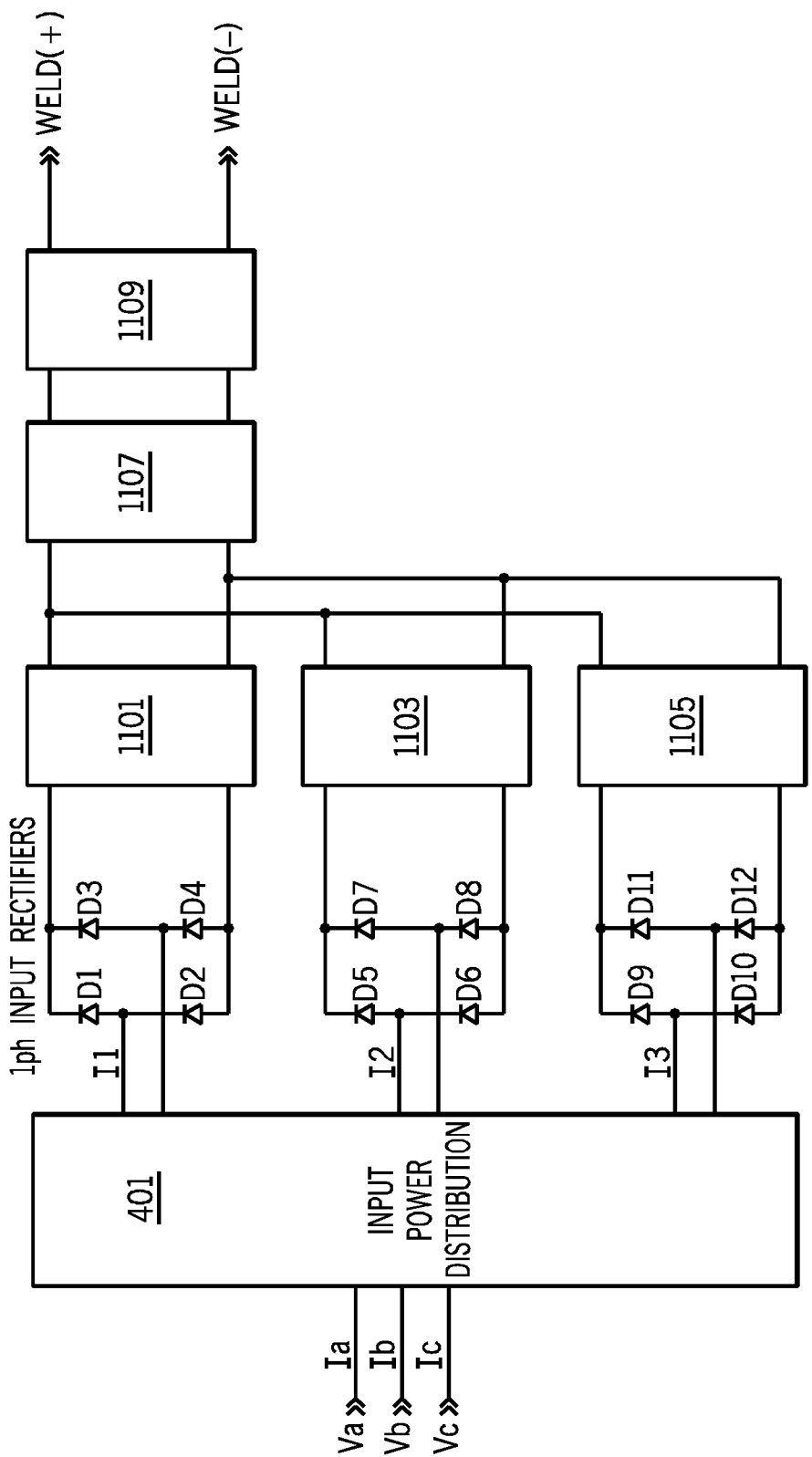
FIG. 11 shows an alternative embodiment of a welding-type system in accordance with the present disclosure.

FIG. 11 shows an alternative topology where each power module 1101-1105 does not include a bus filter and output converter. Rather, the outputs of power modules 1101-1105 are combined into a single dc bus filter 1107, and a single isolated dc-dc converter 1109 is provided.

Another alternative for three phase utility mains connections, is having lower voltage inputs use a conventional delta module connection while having higher voltage inputs (575VAC) connected in a Y configuration to minimize voltage stress.

Numerous modifications may be made which still fall within the intended scope hereof. Thus, it should be apparent that there has been provided a method and apparatus for a welding-type system that fully satisfies the objectives and advantages set forth above. Many alternatives, modifications and variations will be apparent to those skilled in the art. Accordingly, it is intended to embrace all such alternatives, modifications and variations that fall within the spirit and broad scope of the appended claims.

The invention claimed is:

1. A welding-type system, for receiving at least one three phase input voltage on a first power input, a second power input and a third power input, comprising:
a first power module comprising a first pair of input connections, a first single phase boost power circuit, and a first output circuit receiving an output of the first single phase boost power circuit, and wherein the first output circuit provides a first output;
a second power module comprising a second pair of input connections, a second single phase boost power circuit, and a second output circuit receiving an output of the second single phase boost power circuit, and wherein the second output circuit provides a second output;
a third power module comprising a third pair of input connections, a third single phase boost power circuit, and a third output circuit receiving an output of the third single phase boost power circuit, and wherein the third output circuit provides a third output;
a weld output circuit, disposed to receive and combine the first, second and third outputs;
a controller, connected to control the first, second and third power modules; and
an input power distribution module, configurable to connect the first, second and third pair of input connections to the first, second and third power inputs such that the first, second and third pair of input connections each receive a unique single phase power signal, wherein the controller includes an input control module connected to control the input power distribution module; and
wherein the input power distribution module comprises:
a first power switch disposed to connect and disconnect the first power input and a one of the first pair of input connections;
a connection between the second power input and another of the first pair of input connections;

a second power switch disposed to connect and disconnect the second power input and a one of the second pair of input connections;
a third power switch disposed to connect and disconnect the first power input and a one of the third pair of input connections;
a first relay disposed to selectively connect one of the second and third power inputs to another of the third pair of input connection; and
a second relay disposed to selectively connect one of the first and third power inputs to another of the second pair of input connection;
wherein the controller includes an input control module connected to control the first and second relays.

2. The welding-type system of claim 1, further comprising:
a first precharge relay disposed between the first power switch and either of the first pair of input connections;
a second precharge relay disposed between the first relay and either of the second pair of input connections; and
a third precharge relay disposed between the second relay and either of the third pair of input connections;
wherein the controller includes a precharge control module connected to control the first, second and third precharge relays.

3. The welding-type system of claim 1, wherein the controller includes:
a first boost control module having a control output that is connected to control the first single phase boost power circuit;
a second boost control module having a control output that is connected to control the second single phase boost power circuit; and
a third boost control module having a control output that is connected to control the third single phase boost power circuit.

4. The welding-type system of claim 3, wherein the controller includes a welding system control module that receives a user input and provides a control signal in response to the user input to each of the first, second and third boost control modules.

5. The welding-type system of claim 4, wherein the controller is distributed such that the first boost control module is located with the first power module, the second boost control module is located with the second power module, and the third boost control module is located with the third power module.

6. The welding-type system of claim 1, wherein the first, second and third output circuits each include a dc bus filter and an isolated dc-dc converter, and a boosted bus between the dc bus filter and the isolated dc-dc converter.

7. The welding-type system of claim 6, further comprising a control power circuit connected to receive power from each of the boosted busses in the first second and third power modules.

8. The welding-type system of claim 1, wherein the first, second and third single phase boost power circuits each are a single phase, power factor corrected, boost power circuit.

9. A welding-type system, for receiving at least one three phase input voltage on a first power input, a second power input and a third power input, comprising:
a first power module comprising a first pair of input connections, a first single phase boost power circuit, and a first output circuit receiving an output of the first single phase boost power circuit, and wherein the first output circuit provides a first output;
a second power module comprising a second pair of input connections, a second single phase boost power circuit, and a second output circuit receiving an output of the second single phase boost power circuit, and wherein the second output circuit provides a second output;
a third power module comprising a third pair of input connections, a third single phase boost power circuit, and a third output circuit receiving an output of the third single phase boost power circuit, and wherein the third output circuit provides a third output;
a weld output circuit, disposed to receive and combine the first, second and third outputs; and
a controller, connected to control the first, second and third power modules;
wherein the weld output circuit includes a dc bus filter and an isolated dc-dc converter connected to the dc bus filter.

10. The welding-type system of claim 9, further comprising an input power distribution module, configurable to connect the first, second and third pair of input connections to the first, second and third power inputs such that the first, second and third pair of input connections each receive a unique single phase power signal.

11. The welding-type system of claim 10, wherein the controller includes an input control module connected to control the input power distribution module.

12. The welding-type system of claim 11, wherein the input power distribution module comprises:
a first power switch disposed to connect and disconnect the first power input and a one of the first pair of input connections;
a connection between the second power input and another of the first pair of input connections;
a second power switch disposed to connect and disconnect the second power input and a one of the second pair of input connections;
a third power switch disposed to connect and disconnect the first power input and a one of the third pair of input connections;
a first relay disposed to selectively connect one of the second and third power inputs to another of the third pair of input connection; and
a second relay disposed to selectively connect one of the first and third power inputs to another of the second pair of input connection;
wherein the controller includes an input control module connected to control the first and second relays.

13. The welding-type system of claim 11, wherein the input power distribution module comprises:
a first power switch connected to the first power input;
a second power switch connected to the second power input;
a third power switch connected to third power input;
a first, second and third relay, each disposed to uniquely connect one of a unique two of the first, second and third power inputs to a one of the first, second and third pair of input connections; and
a fourth, fifth and sixth relay, each disposed to uniquely connect one of a unique two of the first, second and third power inputs to a second of the first, second and third pair of input connections;
wherein the controller includes an input control module connected to control the first, second, third, fourth, fifth and sixth relays.

14. The welding-type system of claim 11, wherein the input power distribution module comprises:
a first, second and third relay, each disposed to uniquely connect one of a unique two of the first, second and third power inputs to a one of the first, second and third pair of input connections; and a fourth, fifth and sixth relay, each disposed to uniquely connect one of a unique two of the first, second and third power inputs to a second of the first, second and third pair of input connections;

a first power switch connected to one of the first pair of input connections;

a second power switch connected to one of the second pair of input connections;

a third power switch connected to one of the third pair of input connections;

wherein the controller includes an input control module connected to control the first, second, third, fourth, fifth and sixth relays.

15. The welding-type system of claim 10, wherein the first, second and third outputs are substantially equal.

16. A welding-type system, for receiving at least one three phase input voltage on a first power input, a second power input and a third power input, comprising:

a first single phase boost power circuit, having a first pair of input connections, a first of the first pair being connected to the first power input, and the second of the first pair being connected to the second power input, and further having a first pair of bus connections;

a second single phase boost power circuit, having a second pair of input connections, a first of the second pair being connected to the second power input, and the second of the second pair being connected to the third power input, and further having and a second pair of bus connections;

a third single phase boost power circuit, having a third pair of input connections, a first of the third pair being connected to the third power input, and the second of the third pair being connected to the first power input, and further having and a third pair of bus connections;

an intermediate bus, combining the first, second and third pair of bus connections;

an output circuit, disposed to receive the intermediate bus and provide a welding type output; and a controller, connected to control the first, second and third single phase boost power circuits.

17. A welding-type system, for receiving at least one three phase input voltage on a first power input, a second power input and a third power input, comprising:

a first power means for receiving a first single phase input and providing a boosted first output;

a second power means for receiving a second single phase input and providing a boosted second output;

a third power means for receiving a third single phase input and providing a boosted third output;

a weld output circuit, disposed to receive and combine the first, second and third outputs;

controller means, connected to and for controlling the first, second and third power means; and an input distribution module configurable to connect the first, second and third pair of input connections to the first, second and third power inputs such that the first, second and third pair of input connections each receive a unique single phase power signal, wherein the input power distribution module comprises a first power switch disposed to connect and disconnect the first power input and a one of the first pair of input connections, a connection between the second power input and another of the first pair of input connections, a second power switch disposed to connect and disconnect the second power input and a one of the second pair of input connections, a third power switch disposed to connect and disconnect the first power input and a one of the third pair of input connections, a first relay disposed to selectively connect one of the second and third power inputs to another of the third pair of input connection, and a second relay disposed to selectively connect one of the first and third power inputs to another of the second pair of input connection, wherein the controller includes an input control module connected to control the first and second relays.

* * * * *